Jan. 28, 1958  A. C. WINTEMBERG  2,821,150
RAILWAY TRUCK BOLSTER RETAINER
Filed Nov. 8, 1954  2 Sheets-Sheet 2

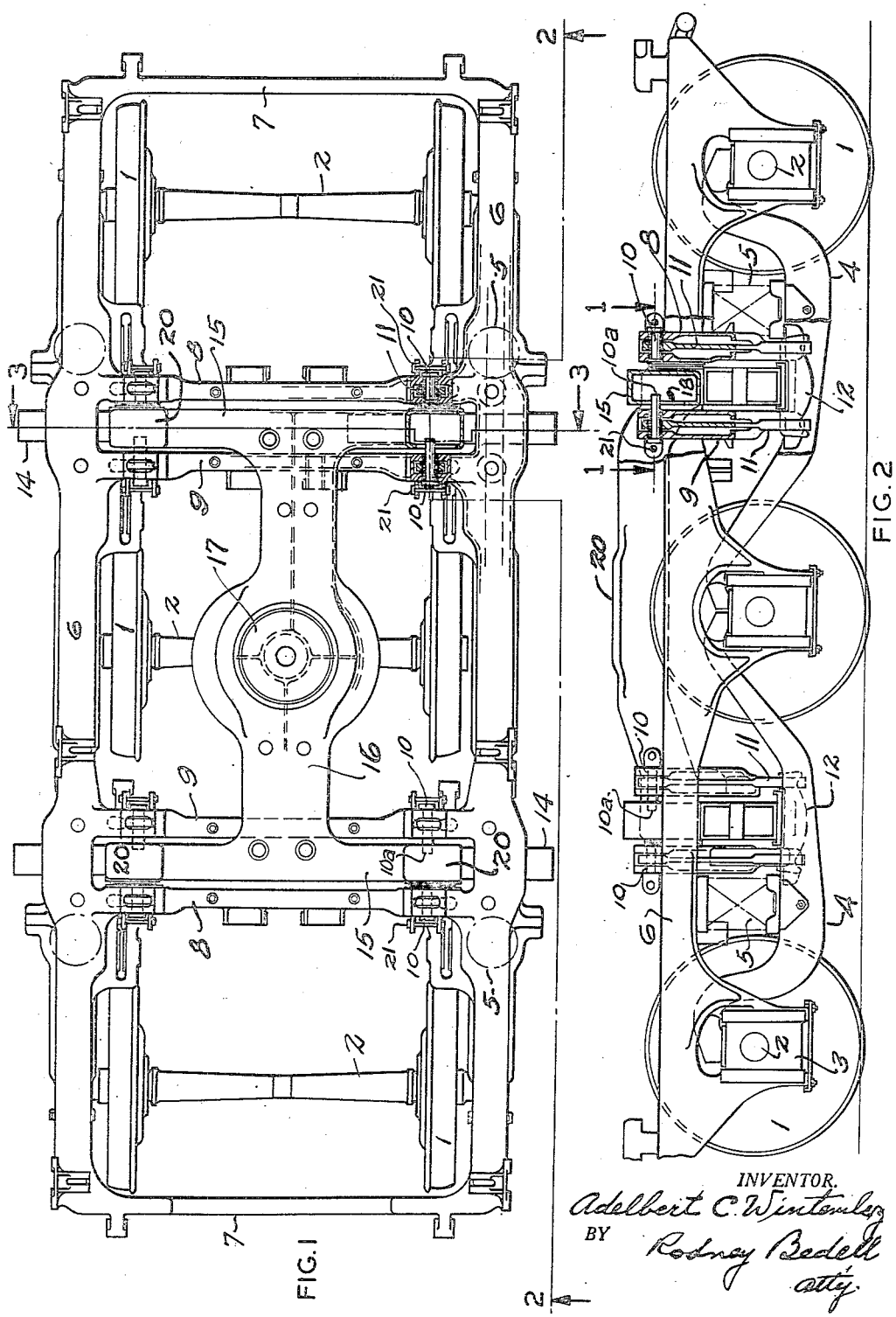

INVENTOR.
Adelbert C. Wintemberg
BY Rodney Bedell

United States Patent Office 2,821,150
Patented Jan. 28, 1958

2,821,150

RAILWAY TRUCK BOLSTER RETAINER

Adelbert C. Wintemberg, Drexel Hill, Pa., assignor to General Steel Castings Corporation, Granite City, Ill., a corporation of Delaware Application November 8, 1954, Serial No. 467,412

1 Claim. (Cl. 105—200)

The invention relates to railway rolling stock and more particularly to truck structure in which the truck bolster is spring-supported upon the truck frame. The invention consists in novel features of the assembly of the truck bolster with the truck frame and running gear.

It is customary to support the truck bolster by swing hangers pivotally suspended from the truck frame so as to provide for lateral movement of the bolster relative to the frame in addition to the relative vertical movement of the bolster and truck frame due to the bolster springs.

In the event of derailment or if the car body is jacked up to accommodate the replacement of springs or other parts of the truck, it is desirable to hold the bolster and truck frame against disassembly, and such holding is generally provided by means of tie bars or brackets between the bolster and truck frame.

The main object of the present invention is to simplify the securing of the bolster and the truck frame against undesirable movement and, more particularly, lifting the bolster from the truck frame. This general object and other detailed objects, as will appear below, are attained by the structure illustrated in the accompanying drawings, in which:

Figure 1 is a top view of a three axle truck, a portion of the drawing being sectioned horizontally on the line 1—1 of Figure 2 to better illustrate the invention.

Figure 2 is a side elevation and vertical longitudinal section taken on the line 2—2 of Figure 1.

Figure 3:
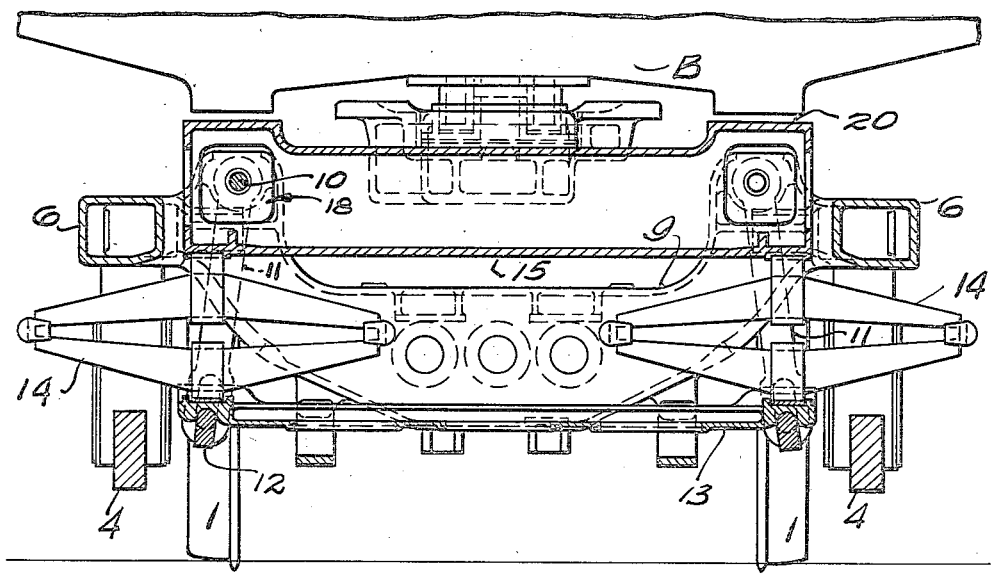
Figure 3 is a vertical transverse section taken on the line 3—3 of Figure 1.
Figure 4:
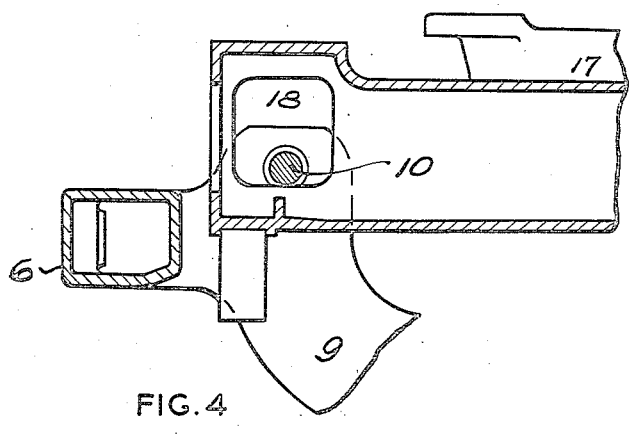
Figure 4 is a detailed section corresponding to a part of Figure 3 and drawn to an enlarged scale and showing the parts in a different relative position.

The truck comprises the usual wheels 1, axles 2, journal boxes 3, equalizers 4, and equalizer springs 5. The truck frame is mounted upon springs 5 and includes side members or wheel pieces 6, transverse end members 7, and a pair of transverse transoms 8, 9, intermediate the middle axle 2 and each end axle. Preferably wheel pieces 6 and each transom 8, 9 is of box-like cross section, the transoms being substantially deeper than the wheel pieces, the walls of the transoms merging with the wheel pieces near the sides of the truck. Pivot pins 10 are seated in suitable bearings in the transoms near the end of the latter. Each pin extends through the transom lengthwise of the truck and is held in place by the usual retaining bolt 21. A swing hanger 11 is suspended from each pin 10 and extends through the bottom of the transom and cooperates with the adjacent hanger to support a cross bar 12. Cross bars 12 at opposite sides of the truck are connected by spring plank 13 and mount bolster springs 14.

The bolster consists of spaced cross bolsters 15, preferably of box-like cross section, connected by a longitudinal central member 16 which is provided with a center plate 17 for supporting the vehicle body, indicated at B. The upper end portion of each cross bolster 15 forms an upwardly facing bearing 20 arranged to engage an opposed side bearing element on the car body B.

One of the pins 10 at each end of each cross bolster 15 projects at 10a from the adjacent side of its transom into an aperture 18 provided in the adjacent wall of the bolster beneath a side bearing 20. Aperture 18 is substantially larger than the diameter of pin 10 so as to permit normal movement of the bolster relative to the frame due to the action of bolster springs 14 and swing hangers 11, but the edges of the bolster aperture form elements opposing the associated pivot pin so as to limit relative movement of the bolster and truck frame. Normally there will be no contact between the pivot pins and the edges of the bolster apertures because the bolster springs do not compress or expand to the extent necessary to effect such contact and the lateral movement of the bolster is limited by contact of the end of the bolster with the opposing face of the wheel piece. In the event of a broken spring, the upper face of the corresponding pin will be engaged by the upper edge of the opening to limit the downward movement of the bolster. In the event of derailment or other cause tending to lift the bolster from the truck, the lower edge of one or more openings in the bolster will engage the corresponding pivot pins to limit the relative movement of the truck and bolster.

This arrangement forms a simple, inexpensive, and effective safety device and assembly feature for the bolster and truck frame.

While only one pin is shown projecting into the bolster at each corner of the bolster, it will be realized that both pins may be similarly projected or a single pin may be substituted for the two pins and lengthened to extend through both transoms and the intermediate cross bolster.

Other details of the structure may be varied without departing from the spirit of the invention and the exclusive use of those modifications coming within the scope of the claim is contemplated.

What is claimed is:

In combination in a railway vehicle truck having three wheel and axle assemblies, a truck frame supported therefrom and including wheel pieces and two pairs of transverse transoms spaced apart lengthwise of the truck, a load carrying bolster comprising spaced cross members of box section, each having spaced upright side walls and each member being positioned between the transoms of one of said pairs, and a longitudinal connecting member extending between said bolster cross members and provided with a center plate, individual spring means supporting each end of each of said cross members, a pair of swing hangers at each end of each bolster cross member supporting said spring means, a pivot pin for the upper end of each swing hanger extending through the same lengthwise of the truck and seated in one of the adjacent transoms, the pin through one transom of each pair of transoms extending beyond the transom into a substantially larger diameter opening in the adjacent side wall of the bolster cross member and limiting the relative movement of the bolster cross member in a vertical plane extending transversely of the truck, and a chafing plate between each bolster cross member and an adjacent frame transom and positioned at the side of the bolster cross member opposite to the pin-receiving side wall and being in alignment with the pin lengthwise of the truck, said chafing plates limiting the movement of the bolster lengthwise of the truck.

References Cited in the file of this patent

UNITED STATES PATENTS

| | | |
|---|---|---|
| 918,807 | Woodard | Apr. 20, 1909 |
| 1,872,102 | Barber et al. | Aug. 16, 1932 |
| 1,885,890 | Beckette | Nov. 1, 1932 |
| 2,309,265 | Travilla et al. | Jan. 26, 1943 |